United States Patent
Suzuki et al.

Patent Number: 5,282,586
Date of Patent: Feb. 1, 1994

[54] APPARATUS FOR CONTROLLING TAPE TENSION IN A MAGNETIC TAPE DEVICE BY CONTROLLING A REVERSE TORQUE MOTOR

[75] Inventors: Masahito Suzuki; Akiyoshi Sarudate, both of Kakuda, Japan

[73] Assignee: Alps Electric Co., Ltd., Tokyo, Japan

[21] Appl. No.: 816,688

[22] Filed: Jan. 2, 1992

[30] Foreign Application Priority Data

Jan. 11, 1991 [JP] Japan ................. 3-13938

[51] Int. Cl.⁵ .................. G11B 15/43; B65H 59/38
[52] U.S. Cl. ................... 242/190; 242/75.43; 360/73.02; 318/7
[58] Field of Search ............ 242/186, 187, 189, 190, 242/191, 75, 75.3, 75.4, 75.43, 75.44, 75.5, 75.51, 75.52; 226/44; 318/6; 360/73.02, 74.3

[56] References Cited

U.S. PATENT DOCUMENTS

| | | | |
|---|---|---|---|
| 3,318,546 | 5/1967 | Bejach | 242/190 |
| 3,419,771 | 12/1968 | Bentley et al. | 318/6 |
| 3,606,201 | 9/1971 | Petusky | 242/190 |
| 3,718,289 | 2/1973 | Alainco | 242/190 |
| 3,746,278 | 7/1973 | Dennis et al. | 242/190 |
| 3,809,335 | 5/1974 | Mantey | 242/190 X |
| 4,218,639 | 8/1980 | Sanguu | 318/6 |
| 4,347,993 | 9/1982 | Leonard | 242/75.51 |
| 4,525,654 | 6/1985 | Tajima et al. | 242/75.51 X |
| 4,672,396 | 6/1987 | Pappas et al. | 242/190 X |
| 4,739,948 | 4/1988 | Rodal et al. | 242/190 |
| 4,788,606 | 11/1988 | Uchikoshi | 242/75.51 X |
| 4,794,473 | 12/1988 | Kawasaki | 360/70 |
| 4,807,107 | 2/1989 | Fincher | 242/190 X |
| 4,902,946 | 2/1990 | Tomitaka | 318/560 |
| 5,032,936 | 7/1991 | Fujioka et al. | 242/75.3 X |
| 5,125,592 | 6/1992 | Sato | 242/189 |

FOREIGN PATENT DOCUMENTS 52-17006  2/1977  Japan ................. 242/189

OTHER PUBLICATIONS

IBM Technical Disclosure Bulletin vol. 14 No. 8 "Reel-to-Reel Tape Unit with Decreased Acceleration", Kollar et al. Jan./1972.

*Primary Examiner*—John M. Jillions
*Assistant Examiner*—John P. Darling
*Attorney, Agent, or Firm*—Guy W. Shoup; Patrick T. Bever

[57] ABSTRACT

A tension control apparatus for a tape player comprising a motor for driving a reel table on which a tape reel is installed, a tension detector which is pressed by a biasing force of a spring to contact with a tape extending from the tape reel, a sensor for detecting a shifting amount of the tension detector, and a servo circuit which controls a load of the motor in response to an output of the sensor. The tension control apparatus further comprises a switching device which controls the load of the motor by a voltage supplied from an electric power source other than an output voltage supplied from the servo circuit until the output voltage from the servo circuit is stabilized when shifted to a tape travelling mode. And further the tension control apparatus comprises a limiter which suppresses the output voltage from the servo circuit to be equal to or less than a predetermined value. Thus, the present invention prevents an excessive reverse torque from occurring in a motor even if the tension detector abruptly hits the tape when the operation mode shifts from a stop mode to a play mode.

8 Claims, 4 Drawing Sheets

APPARATUS FOR CONTROLLING TAPE TENSION IN A MAGNETIC TAPE DEVICE BY CONTROLLING A REVERSE TORQUE MOTOR

BACKGROUND OF THE INVENTION

1. Field of the Invention

The present invention relates to a tension control apparatus which controls a tension of a tape extending from a tape reel in a rotary head type tape player or another tape player which is applied to a VTR or a DAT, and especially to, a tension control apparatus for a tape player which is capable of preventing excessive tape tension from acting due to the sudden vibration in a tension detecting member shortly after an operational condition is shifted to a tape travelling mode.

2. Related Art

FIG. 7 is a plane view showing a tape travelling portion of the rotary head type tape player. On a chassis 1, there are provided a feeding-side reel table 2 and a winding-side reel table 3. On each of the reel tables 2 and 3 there is installed a tape reel in which a tape T is wound. The tape player shown in the drawing is a direct drive type, in which the feeding-side reel table spindle 2 and the winding-side reel table 3 are driven directly by a motor M1 and M2, respectively. A magnetic tape T is pulled and guided by loading posts 4 and 5 to be wound partly on a rotary head device 6. In a play mode, the tape T is sandwiched by a capstan 7 and a pinch roller 8 and, in turn, sent out by the rotational force of the capstan 7. And, a rotary drum of the rotary head apparatus 6 rotates together with a magnetic head so as to perform a recording operation or a playback operation.

A reference numeral 10 denotes a tension arm provided as a tension detecting member. At a front end of the tension arm 10 there is fixedly provided a tension post 11. The tension arm 10 is provided to be rotatable about a shaft 13, and the tension post 11 is pressed against the tape T to contact therewith between the posts 4 and 9. On the tension arm 10 there are provided a pair of magnets 14a and 14b, and on the chassis 1 there is provided a hole element 15 as a sensor which detects a shifting amount of the magnets 14a and 14b.

With the above arrangement, for example in a play mode, the tension post 11 shifts in response to the strength of tension of the tape driven to travel by the capstan 7. The shifting amount is output from the hole element 15 by detecting the magnetic poles of the magnets 14a and 14b. The output from the hole element 15 is input to the servo circuit. Then, by a motor control voltage supplied from the servo circuit, a reverse torque of the feeding-side motor M1 is controlled so that an appropriate tension is applied on the tape T. By controlling the tension of the tape, a magnetic head contact pressure between the tape T and the rotary head device 6 is maintained in an appropriate condition.

In accordance with the above tension control apparatus for the rotary head type tape player, in the condition that the loading of the tape is completed as shown in FIG. 7, at a stop mode the pinch roller 8 departs or is released from both the tape T and the capstan 7 so that the tape feeding force by the capstan 7 is not transmitted to the tape T, and the tension arm 10 rotates in a clockwise direction so that the tension post 11 departs from the tape T. And when the operational condition is shifted to a play mode; i.e. a recording/playback mode, the pinch roller 8 pushes the tape T to the capstan 7 and, at the same time, the tension arm 10 rotates in a counter-clockwise direction by a biasing force of the spring 12 s that the tension post 11 contacts with the tape T, thereby realizing the condition where the tension detection becomes possible through the tension arm 10.

In a switching operation from the stop mode to the play mode, the tension arm 10 is abruptly rotated in the counter-clockwise direction due to the elastic force of the spring 12 and, therefore, the tension post 11 hits the tape T abruptly. Accordingly, a tension detecting output which is detected by the hole element 15 comes to indicate an abrupt change in response to the vibration caused by the sudden movement of the tension arm 10. For example, in FIG. 8, a wave (A) shows a motor control voltage being output from the servo circuit on the basis of the detection of the hole element 15 in the case that the tension post 11 suddenly shifts toward the tape T by the biasing force of the spring 12 shortly after the operational condition is shifted from the stop mode to the play mode.

The steep wave indicated by (A) has the same directional tendency as an output that is produced when the tape tension is too weak, therefore this motor control voltage causes the sudden reverse torque in the feeding-side motor M1 shown in FIG. 7. Thus, upon this reverse torque acting on the motor M1, the motor M1 strongly pulls the tape T. This means that the tape tension is suddenly enhanced in spite of the fact that the tape tension is not weakened. Thus, it results in that the tape T is damaged.

SUMMARY OF THE INVENTION

The present invention is carried out to resolve the problems or disadvantages encountered in the prior art, and its object is to provide a tension control apparatus for a tape player which is capable of preventing the damage of the tape from increasing for example when the operational condition is shifted from the stop mode to the play mode by suppressing the occurrence of the excessive reverse torque of the motor even if the tension detecting member abruptly hits the tape T.

In accordance with one aspect of the present invention, there is provided a tension control apparatus for a tape player comprising a motor for driving a reel table on which a tape reel is installed, a tension detecting member which is pressed by a biasing force of an elastic member to contact with a tape extending from the tape reel, a sensor for detecting a shifting amount of the tension detecting member, and a servo circuit which controls a load of the motor in response to an output of the sensor, said tension control apparatus further comprising a switching means which controls the load of the motor by a voltage supplied from an electric power source other than an output voltage supplied from the servo circuit until the output voltage from the servo circuit is stabilized when an operating condition is shifted to a tape travelling mode.

Furthermore, in accordance with another aspect of the present invention there is provided a tension control apparatus for a tape player comprising a motor for driving a reel table on which a tape reel is installed, a tension detecting member which is pressed by a biasing force of an elastic member to contact with a tape extending from the tape reel, a sensor for detecting a shifting amount of the tension detecting member, and a servo circuit which controls a load of the motor in response to an output of the sensor, said tension control apparatus further comprising a limiter which suppresses the output voltage from the servo circuit to be equal to or less than a predetermined value.

With above arrangement of the one aspect of the present invention, in the case such that the operating condition is switched from the stop mode to the play mode, when the tension detecting member hits the tape suddenly due to the biasing force of the elastic member and the sensor outputs the detection signal indicating the abrupt change, the electric power source other than the control output of the servo circuit feeds the voltage to the reel driving motor as a control voltage. By this voltage, the tape reel is given a reverse torque. Moreover, when the tension detecting member no longer vibrates and the servo circuit has resumed to supply a stable output, the motor is again switch to the servo circuit so that the control voltage for the motor is given by the servo motor and, subsequently, restores to the usual tension control operation.

With above arrangement of another aspect of the present invention, in the case such that the operating condition is switched from the stop mode to the play mode, when the tension detecting member hits the tape suddenly due to the biasing force of the elastic member and the sensor outputs the detection signal indicating the abrupt change, the output is limited to be equal to or less than the predetermined value. Accordingly, it becomes possible to prevent the reverse torque from occurring suddenly in the motor.

The above, and other objects, features and advantages of the present invention will become apparent from the following detail description which is to be read in conjunction with the accompanying drawings.

BRIEF DESCRIPTION OF THE ACCOMPANYING DRAWINGS

Figure 5:
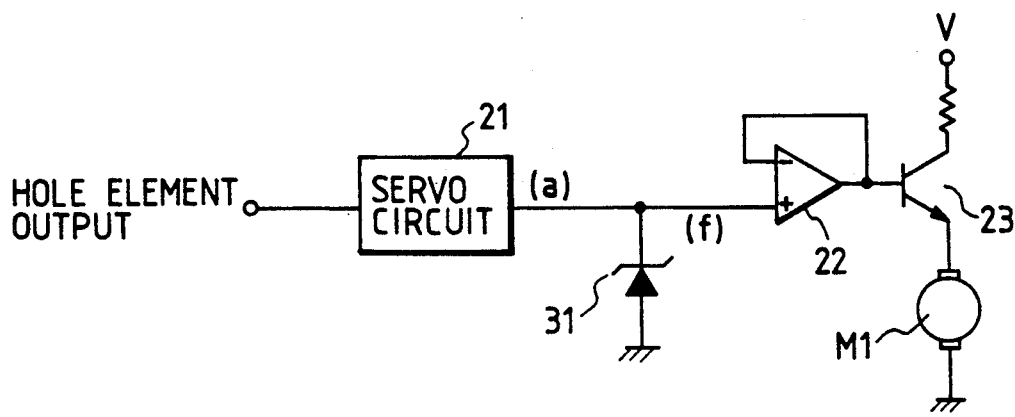
Figure 6:
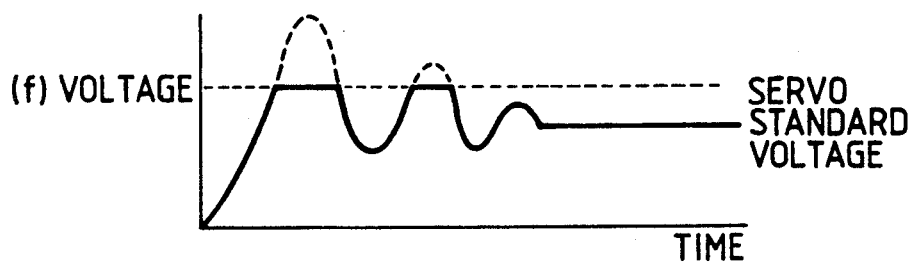
Figure 7:
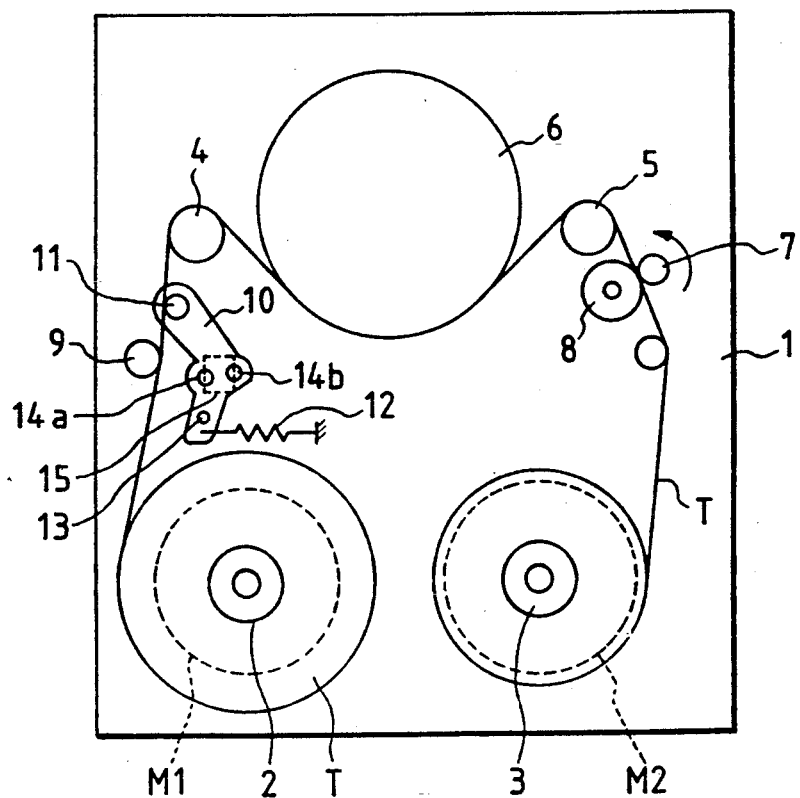
Figure 8:
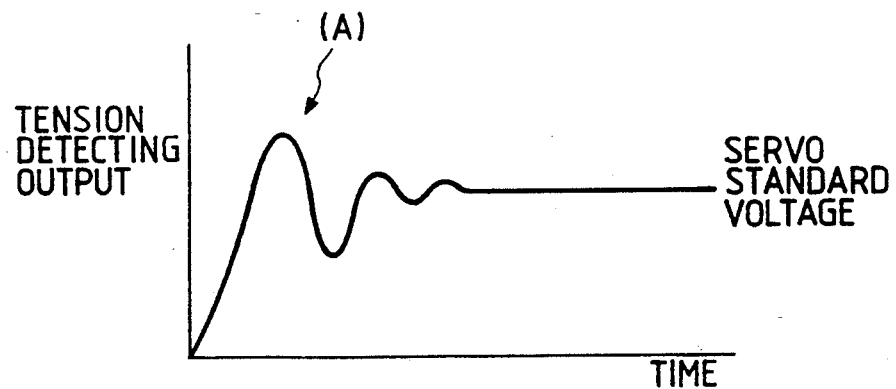

FIGS. 4(a)–4(d) are time charts showing the changes of voltages at various points in accordance with the second embodiment of the present invention;

FIG. 5 is a block diagram showing a circuit of a tension control apparatus in accordance with the third embodiment of the present invention;

FIG. 6 is a time chart showing the change of the motor control voltage in accordance with the third embodiment of the present invention;

FIG. 7 is a plane view showing a tape travelling portion of a rotary head type tape player; and FIG. 8 is a time chart showing the change of the motor control voltage to explain the problem of the related art.

DETAILED DESCRIPTION OF THE PREFERRED EMBODIMENT

Hereinafter, referring now to FIGS. 1 to 6, the preferred embodiment of the present invention is explain in more detail.

Figure 1:
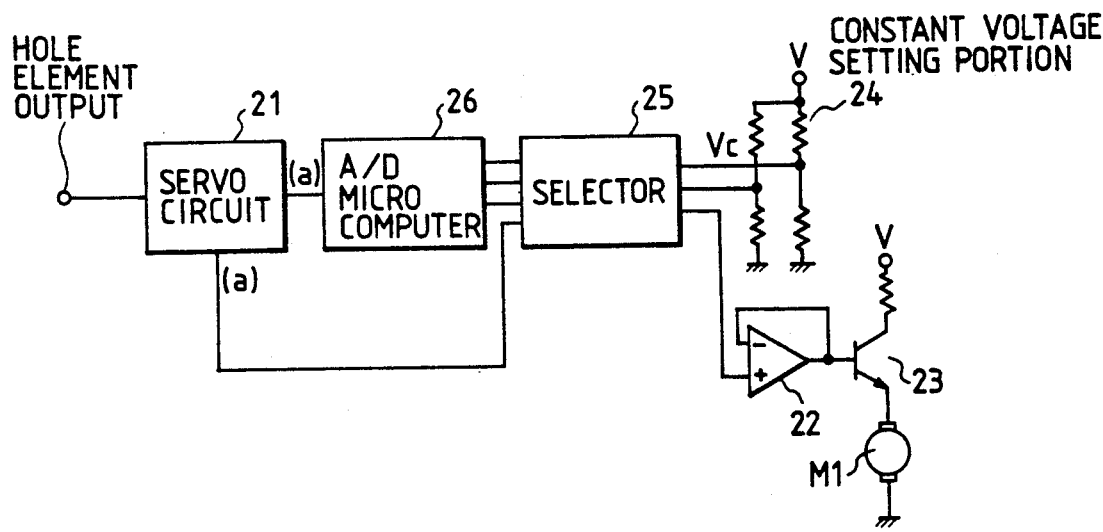
FIG. 1 is a block diagram showing a circuit of a tension control apparatus in accordance with the first embodiment of the present invention.

FIG. 1 is a block diagram showing a circuit of a tension control apparatus in accordance with the first embodiment of the present invention. In the drawing, a reference numeral 21 denotes a servo circuit. A sensor output signal from a hole element sensor 15 shown in FIG. 7 is input to the servo circuit 21, and a motor control voltage (a) is output from the servo circuit 21. Usually, this motor control voltage (a) is input into a base of a transistor 23 through a buffer amplifier 22 and, subsequently, a motor M1 generates a reverse torque so as to set an adequate tape tension.

In the embodiment of FIG. 1, said motor control voltage (a) is input into a buffer amplifier 22 through a selector 25, and this selector 25 alternatively selects the motor control voltage (a) output from the servo circuit 21 and a constant voltage Vc being set in a constant voltage setting portion 24 and, in turn, supplies the selected one to the buffer amplifier 22. Moreover, the motor control voltage (a) from the servo circuit 21 is also input into an input portion of a micro computer 26 which performs an A/D transducing of the input signal. Then, the selector 25 is switched by the control signal from the micro computer 26.

Next, the operation of the first embodiment shown in FIG. 1 is explained. When the operating condition is switched from the stop motion to the play motion in the tape travelling portion in FIG. 7, the tension arm 10 rotates so abruptly in a counter-clockwise direction by a biasing force of the spring 12 that the tension post 11 hits the tape T strongly. In this case, the hole element 15 detects magnetic fields of the magnets 14a and 14b and the servo circuit 21 outputs a motor control voltage (a) which shows a radical change as indicated by a region (B) of FIG. 2.

This motor control voltage (a) is input into the micro computer 26, and the micro computer 26 supplies a control signal to the selector 25 only when the servo circuit 21 outputs the radically changing signal. Accordingly, the selector 26 is switched so that the constant voltage Vc of the constant voltage setting portion 24 is supplied to the buffer amplifier 22.

Figure 2:
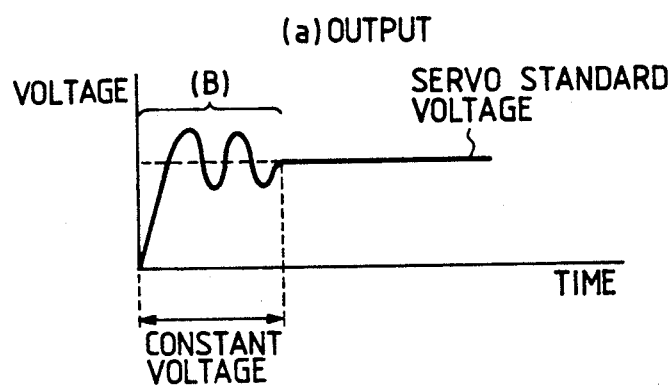
FIG. 2 is a time chart showing the change of the motor control voltage in accordance with the first embodiment of the present invention.

Namely, when the motor control voltage (a) of the servo circuit 21 is changing suddenly as is indicated by the region (B) of FIG. 2, the motor control voltage (a) is not utilized but, the constant voltage Vc of the constant voltage setting portion 24 is supplied to the transistor 23 so that the motor M1 generates a reverse torque.

On the other hand, when the motor control voltage (a) of the servo circuit 21 approaches to a servo standard voltage and becomes a stabilized condition, the micro computer 26 outputs a control signal to the selector 25. Accordingly, the selector 25 is switched again so that the transistor 23 is actuated by the motor control voltage (a) of the servo circuit 21 so as to generate the reverse torque.

After the motor control voltage (a) of the servo circuit 21 approaches to a servo standard voltage and becomes a stabilized condition, variation of the tape tension shifts the tension arm 10. This is detected by the hole element 15, and the motor control voltage (a) output from the servo circuit 21 shows an output which changes in an up-and-down direction about the standard of the servo standard voltage. By this output, the reverse torque of the motor M1 is controlled so that the tape tension is maintained to be an appropriate value.

Though the micro computer 26 is watching as to whether or not the sudden changes of the motor control voltage (a) occurs as shown by the region (B) of FIG. 2 and controls the selector 25, it is possible to set a predetermined time instead of detecting the actual changes. Because, the changes of the motor control voltage (a) as shown in FIG. 2 is limited within a short period of time shortly after the operating condition is shifted from the stop mode to the play mode. In this case, the motor M1 is controlled by the constant voltage Vc of the constant voltage setting portion 24 during the predetermined short period of time after the operating condition is changed from the stop mode to the play mode.

Figure 3:
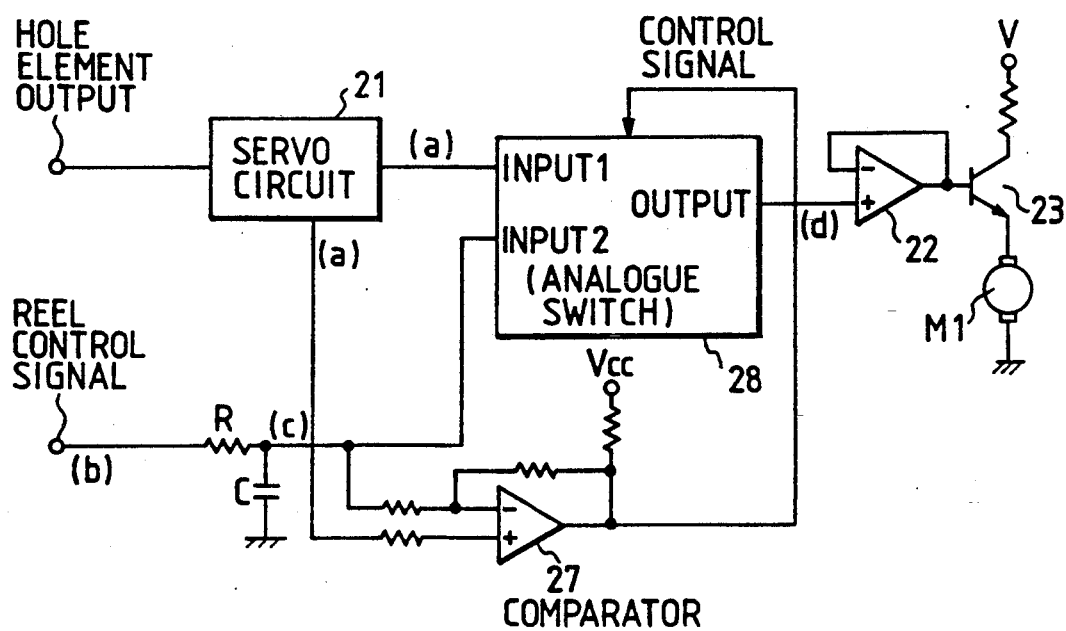
FIG. 3 is a block diagram showing a circuit of a tension control apparatus in accordance with the second embodiment of the present invention.

FIG. 3 shows the second embodiment of the present invention. In this embodiment, there is provided the similar servo circuit 21 as that of FIG. 1. The motor control voltage (a) output from the servo circuit 21 is input into input 1 of an analogue switch 28, and a reel control signal (b) is input through a differential circuit comprised of a resister R and a capacitor C into input 2 of the analogue switch 28 as a voltage source.

The reel control signal (b) becomes a high level (5 volts) when the winding-side reed motor M2 is activated, and becomes a low level (0 volt) when the reel motor M2 is deactivated. When this reel control signal (b) passes the differential circuit, a voltage which increases gradually up to 5 volts as is indicated by (c) of FIG. 4 is obtain by virtue of time constant determined by the resister R and the capacitor C.

Figure 4:
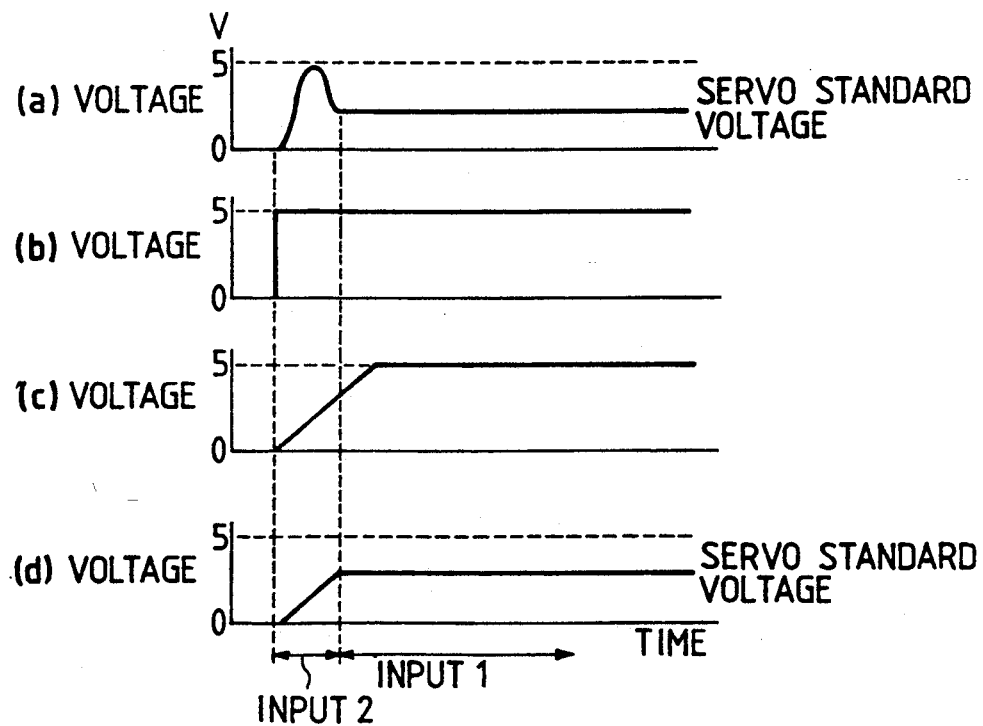

Moreover, in this embodiment, as shown in FIG. 4, the motor control voltage (a) output from the servo circuit 21 is set to suddenly increase shortly after the operating condition is shifted from the stop mode to the play mode and, after that, to be stabilized so as to be lower than 5 volts.

A reference numeral 27 denotes a comparator. By this comparator 27, the motor control voltage (a) fed from the servo circuit 21 and the voltage (c) are compared. And then, as a result of comparison, a control signal is output so as to switch the analogue switch 28. When the voltage (a) is higher than the voltage (c), the comparator 27 outputs a control signal to the analogue switch 28 to switch to input 2. On the contrary, when the voltage (a) is lower than the voltage (c), the comparator 27 outputs a control signal to the analogue switch 28 to switch to input 1. That is, the analogue switch 23 selects a lower voltage of these two voltages (a) and (b).

Next, the operation of the above embodiment is explained.

When the operating condition is shifted from the stop mode to the play mode, the tension post 11 shown in FIG. 7 hits the tape so abruptly that the tension arm 10 suddenly rotates in the counter-clockwise direction. For this movement, as shown in FIG. 4, the motor control voltage (a) fed from the servo circuit 21 is suddenly changed in response to the output of the magnetic field detection by the hole element 15 and, later, is stabilized so as to approach to the servo standard voltage.

On the other hand, when the operating condition is changed from the stop mode to the play mode, the voltage (b) of the reel control signal is increased from the low level to the high level in response to the starting of the motor M2. However, due to the time constant determined by the register R and the capacitor C the voltage (c) gradually increases.

The analogue switch 28 is switched by the control signal fed from the comparator 27 so as to select the lower one of the two voltages (a) and (c). Therefore, as shown in the bottom time chart of FIG. 4, when the operating condition is switched from the stop mode to the play mode and the motor control voltage (a) is suddenly raised, the analogue switch 28 is switched to input 2 and, in turn, the voltage (c) is input into the buffer amplifier 22.

To the contrary, after the motor control voltage (a) is stabilized, the analogue switch 28 is switched to the input 1. Therefore, the servo standard voltage which has a value lower than the voltage of 5 volts is input into the buffer amplifier 22.

Accordingly, the control signal (d) input into the buffer amplifier 22 shows a smooth increase and, therefore, it can be prevented the sudden reverse torque from causing in the motor M1.

FIG. 5 shows the third embodiment of the present invention.

In the embodiment, there is provided a limiter 31 in a path of the motor control voltage (a) output from the servo circuit 21 on the basis of the detection output signal of the hole element 15. The level of this limiter 31 is set to be higher than the voltage variation value which is required for the tension servo having a central value of the servo standard voltage.

In this embodiment, even if the motor control voltage (a) fed from the servo circuit 21 is suddenly raised shortly after the operating condition is shifted from the stop mode to the play mode, the increasing amount of the motor control voltage (a) does not exceed the level of the limiter 31. Accordingly, the transistor 23 is supplied a voltage having no abruptly increasing portion as shown in FIG. 6, therefore, it can be prevented the reverse torque of the motor M1 from suddenly increasing.

Though the above embodiments show the case that the invention is applied to the abrupt changes of the output signal of the tension detected when the operational condition is changed from the stop mode to the play mode, it is similarly applicable to the case, for example, that the tension control is required in a cue or review mode.

As is apparent from the foregoing description, in accordance with the present invention, when the operational condition is changed from the stop mode to the play mode, it can be surely prevented the excessive reverse torque which is caused due to the abrupt shift of the tension detecting member from acting on the reel driving motor and, therefore, it is prevented the excessive tension from acting on the tape so as not to damage the tape.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalent of such meets and bounds are therefore intended to embraces by the claims.

What is claimed is:

1. A tension control apparatus for a tape player, the tape player including a feeding-side spindle driven by a reverse torque motor, a winding-side spindle driven by a winding motor, a voltage source and a switch for connecting the voltage source to the winding motor and the reverse torque motor in a play mode and for disconnecting the voltage source in a stop mode, the tape player including a head for reading from or writing to a tape trained between the feeding-side spindle and the winding-side spindle, the tension control apparatus comprising:

a tape tensioner movably connected to the tape player and biased against the tape, the tensioner being positioned relative to the tape player in response to a tension in the tape;

a sensor fixedly connected to the tape player for detecting the position of the tensioner and for generating a sensor signal corresponding to the position of the tensioner;

a servo circuit for receiving the sensor signal and connected to the voltage source through the switch, the servo circuit generating a load control voltage in response to the sensor signal;

a constant voltage circuit, connected to the voltage source through the switch, for generating a constant load voltage;

means, connected to the servo circuit, for generating a control signal when variations of the load control voltage are above a predetermined minimum; and a selector circuit for receiving the load control voltage and the constant load voltage, the selector circuit being connected to the control signal generating means, the selector circuit transmitting the constant load voltage to the reverse torque motor when the control signal generating means transmits the control signal, and transmitting the load control voltage to the reverse torque motor at all other times.

2. The tension control apparatus of claim 1 wherein the means for generating the control signal comprises a computer.

3. The tension control apparatus of claim 1 wherein the means for generating a control signal comprises a delay circuit for generating the control signal a predertermined amount of time after the tape player is switched from the stop mode to the play mode.

4. A tension control apparatus for a tape player, the tape player including a feeding-side spindle driven by a reverse torque motor, a winding-side spindle driven by a winding motor, a voltage source and a switch for connecting the voltage source to the winding motor and the reverse torque motor in a play mode and for disconnecting the voltage source in a stop mode, the tape player including a head for reading from or writing to a tape trained between the feeding-side spindle and the winding-side spindle, the tension control apparatus comprising:

a tape tensioner movably connected to the tape player and biased against the tape, the tensioner being positioned relative to the tape player in response to a tension in the tape;

a sensor fixedly connected to the tape player for detecting the position of the tensioner and for generating a sensor signal corresponding to the position of the tensioner;

a servo circuit for receiving the sensor signal and connected to the voltage source through the switch, the servo circuit generating a first load control voltage in response to the sensor signal;

a differential circuit connected to the voltage source through the switch, the differential circuit generating a second load control voltage, the second load control voltage having a gradual rise time; and means for connecting the lower of the first load control voltage and the second load control voltage to the reverse torque motor.

5. The tension control apparatus of claim 4, wherein the connecting means comprises:

a comparator connected to receive the first and the second load control voltages and for generating a control signal having an amplitude determined by a difference between the first load control voltage and the second load control voltage; and an analogue switch connected to receive the first and the second load control voltages and the control signal, and for transmitting one of the first and the second load control voltages in response to the control signal.

6. The tension control apparatus of claim 4, wherein the circuit comprises an resistor/capacitor network.

7. A tension control apparatus for a tape player, the tape player including a feeding-side spindle driven by a reverse torque motor, a winding-side spindle driven by a winding motor, a voltage source and a switch for connecting the voltage source to the winding motor and the reverse torque motor in a play mode and for disconnecting the voltage source in a stop mode, the tape payer including a head for reading from or writing to a tape trained between the feeding-side spindle and the winding-side spindle, the tension control apparatus comprising:

a tape tensioner movably connected to the tape player and biased against the tape, the tensioner being positioned relative to the tape player in response to a tension in the tape;

a sensor fixedly connected to the tape player for detecting the position of the tensioner and for generating a sensor signal corresponding to the position of the tensioner;

a servo circuit for receiving the sensor signal and connected to the voltage source through the switch, the servo circuit transmitting a load control voltage to the reverse torque motor in response to the sensor signal; and a limiting circuit, connected between the servo circuit and the reverse torque motor, for limiting the load control voltage to a predetermined maximum.

8. The tension control apparatus of claim 7, wherein the limiting circuit comprises a grounded zener diode.

* * * * *